United States Patent [19]

Burgess

[11] Patent Number: 5,504,889

[45] Date of Patent: Apr. 2, 1996

[54] METHOD AND SYSTEM FOR MONITORING FILE ATTRIBUTES USING BITMAPS TO DETERMINE GROUP MEMBERSHIP OF FILES AND TO DETERMINE WHICH FILES HAVE BEEN PROCESSED

[75] Inventor: Henry W. Burgess, Woodinville, Wash.

[73] Assignee: Microsoft Corporation, Redmond, Wash.

[21] Appl. No.: 175,042

[22] Filed: Dec. 28, 1993

[51] Int. Cl.$^6$ ........................................... G06F 17/30
[52] U.S. Cl. ........................ 395/600; 364/DIG. 1; 364/222.81
[58] Field of Search ..................... 395/600, 700

[56] References Cited

U.S. PATENT DOCUMENTS

| | | | |
|---|---|---|---|
| 5,220,604 | 6/1993 | Gasser et al. | 380/23 |
| 5,410,688 | 4/1995 | Williams et al. | 395/600 |
| 5,412,776 | 5/1995 | Bloomfield et al. | 395/160 |

Primary Examiner—Thomas G. Black
Assistant Examiner—John C. Loomis
Attorney, Agent, or Firm—Seed & Berry

[57] ABSTRACT

A method and system for monitoring attributes of files, such as whether a file has been read, in a computer system includes a file index organized into groups, with at least one group including one or more files. The computer system also includes a number of bitmaps. A group bitmap is maintained for each group of the file index, with each group bitmap specifying the files included within the group. A user bitmap is maintained for each user of the computer system and specifies the files in the file index that have been read by the user. When the user of the computer system enters a request to determine which files within a selected group have been examined and which remain unexamined, the preferred embodiment performs a logical AND operation on the group bitmap for the selected group and the user bitmap for the user to produce a result bitmap. The computer system determines the answers to the user's request based on the contents of the result bitmap.

33 Claims, 11 Drawing Sheets

METHOD AND SYSTEM FOR MONITORING FILE ATTRIBUTES USING BITMAPS TO DETERMINE GROUP MEMBERSHIP OF FILES AND TO DETERMINE WHICH FILES HAVE BEEN PROCESSED

TECHNICAL FIELD

This invention relates to a computer method and system for tracking attributes of files stored on the system.

BACKGROUND OF THE INVENTION

Existing computer systems provide users access to files stored on the system. For example, conventional systems provide users with the ability to browse a list of files and to open files on the list. In this way, users have been able to easily and efficiently read files stored on the computer system. However, current systems do not keep track of which files a user has read and which files remain unread by the user. As a result, a user must rely on his own memory to determine which files he has read.

SUMMARY OF THE INVENTION

In accordance with a first aspect of the present invention, a method and system for monitoring attributes of files in a computer system are provided. The computer system includes a file index organized into categories with at least one category including one or more files. In a preferred embodiment, the computer system also includes a number of bitmaps. A category bitmap is maintained for each category of the file index, with each category bitmap specifying the files included within the category. A user bitmap is maintained for each user of the computer system and specifies the files in the file index that have been examined by the user. When the user of the computer system enters a request to determine which files within a selected category have been examined and which remain unexamined, the preferred embodiment performs a logical AND operation on the category bitmap for the selected category and the user bitmap for the user to produce a result bitmap. The computer system determines the answers to the user's request based on the contents of the result bitmap.

DETAILED DESCRIPTION OF THE INVENTION

An embodiment of the present invention provides an efficient and robust means for determining which documents in a group of documents have been read by a user, and which documents in the group have not been read by the user. Documents in the system are logically organized into folders, and the folders are organized into a hierarchy of categories. Each user has an associated user bitmap (described in more detail below) that contains bit values specifying which documents in the folder the user has read. Each category has an associated category bitmap (discussed in more detail below) that contains bit values specifying which documents are included in the category. To determine which documents in a category have been read by a user, the preferred embodiment performs a logical AND operation on the user bitmap and the category bitmap. The end result of the logical AND operation is a result bitmap having bit values that specify the documents in the category that have been read by the user. To determine which documents in a category have not been read by a user, the preferred embodiment performs a logical AND operation on the category bitmap and the logical inverse (NOT) of the user bitmap.

The embodiment of the present invention described below concerns an implementation that monitors which documents in a category have been read by a user and which documents in the category remain unread by the user. Nevertheless, those skilled in the art will appreciate that the present invention may also be implemented in other environments wherein other attributes of files are monitored.

Figure 1:
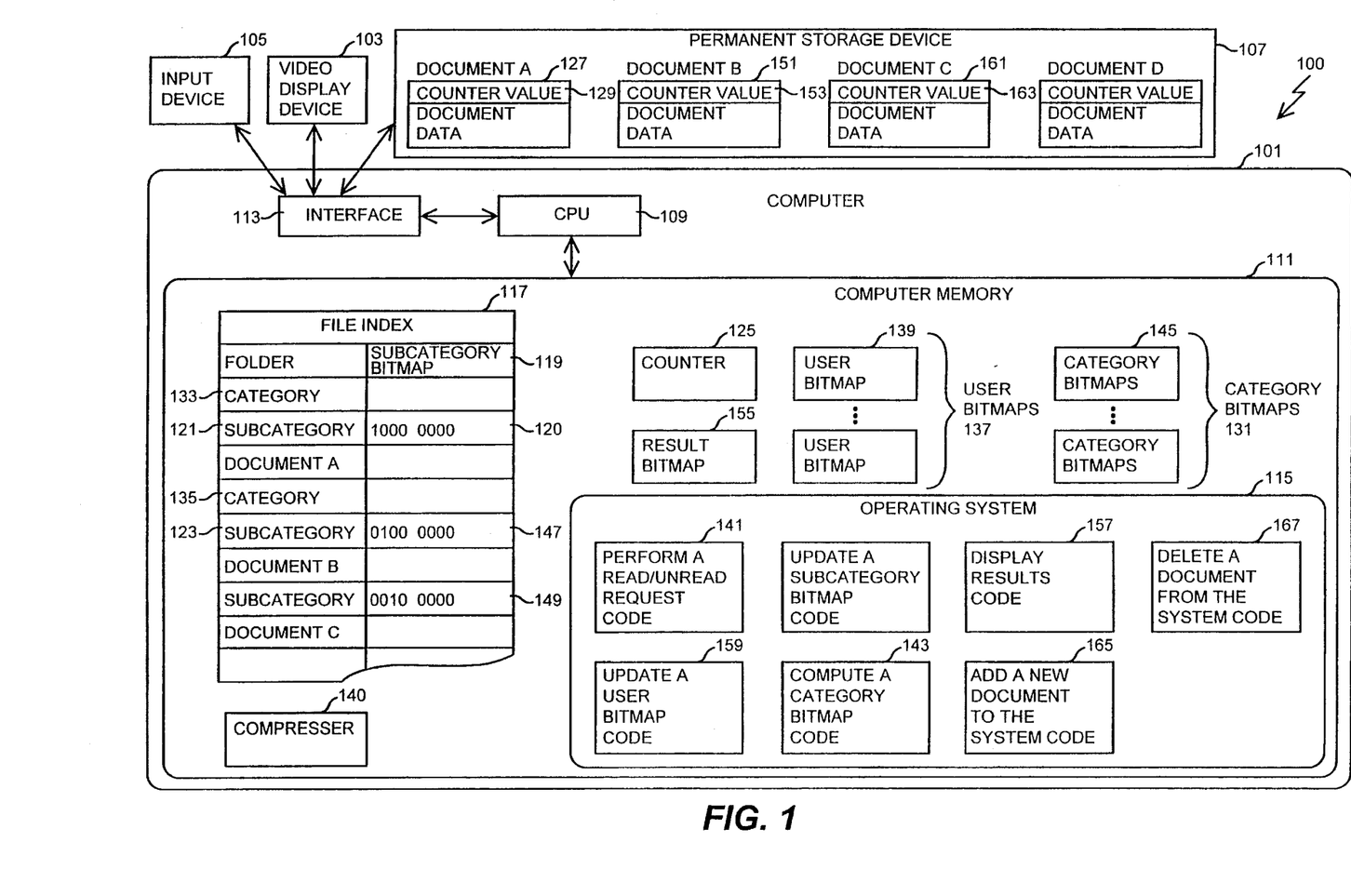
FIG. 1 is a block diagram of a computer system for practicing a preferred embodiment of the present invention.

FIG. 1 is a block diagram of a computer system 100 for practicing the preferred embodiment of the present invention. The computer system 100 includes a computer 101, a video display device 103, an input device 105, such as a keyboard, mouse, or pointing device, and a permanent storage device 107, such as a disk drive. The computer 101 includes a central processing unit (CPU) 109, a computer memory 111, and an interface 113 for enabling communication between the CPU 109 and peripheral devices (i.e., the video display device 103, the input device 105, and the permanent storage device 107). The contents of the permanent storage device 107 will be described in more detail below.

The computer memory 111 holds a number of items, including a copy of an operating system 115 that is responsible for controlling the allocation and usage of the hardware resources of the system, such as memory 111, central processing unit 109, and permanent storage device 107. The computer memory 111 also holds a file index 117 which organizes the files stored on the computer system 100 into a hierarchical structure of categories and sub-categories. The file index 117 can be saved to the permanent storage device 107. The components of the operating system 115 and the other items held in computer memory 111 will be described in more detail below.

In order to determine which documents in a selected category of the file index 117 have been read by the user, the computer system 100 monitors the files that have been stored in the selected categories. The present invention monitors the categorization of files by providing subcategory bitmaps 119 that are stored in the file index 117. Each subcategory bitmap 119 specifies the documents indexed in an associated subcategory of the file index 117. Each subcategory of the file index 117, such as subcategory 121 or subcategory 123, represents an organizational unit of the file index 117 which indexes documents stored on the permanent storage device 107.

Figure 2:
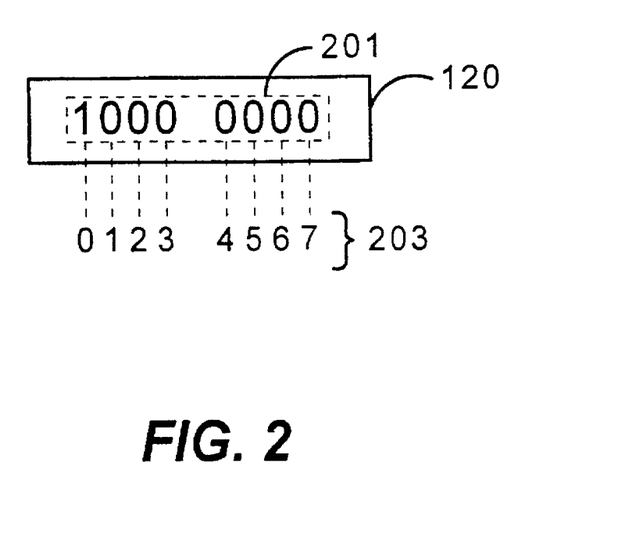
FIG. 2 illustrates a subcategory bitmap generated in accordance with the preferred embodiment of the present invention.

FIG. 2 illustrates a preferred data structure for the subcategory bitmap 120, which is associated with the subcategory 121 of the file index 117. While subcategory bitmaps will be discussed by way of example to subcategory bitmap 120, it should be understood that the discussion applies equally to all subcategory bitmaps 119 in the file index 117. The subcategory bitmap 120 comprises a group of bits 201. Each bit in the group 201 has a bit position 203. By convention, bits are referenced by their bit position. For example, a bit in the first bit position is known as bit 0, while a bit in the fifth bit position is known as bit 4.

Each bit in the group of bits can be assigned a value of "0" or "1." When one of the bits in the subcategory bitmap 120 is assigned a value "1," the associated document is in the subcategory of the file index 117. To understand how the preferred embodiment associates a document from the file index 117 with a bit in the subcategory bitmap 120, it is necessary to introduce the idea of counter values, which are numbers output from a counter 125 and stored in each document of the computer system 100. The value of the counter 125 monotonically increases. Those of ordinary skill in the art will understand that the counter 125 can also be implemented to output monotonically decreasing numbers.

Suppose a document 127 (FIG. 1) stored on the permanent storage device 107 is indexed in the subcategory 121 of the file index 117. Indexing involves assigning a bit position in a bitmap to a document. Documents are typically indexed when the document is initially stored in the permanent storage device 107 or after the document is opened, modified or restored to the permanent storage device 107. During the process of indexing the document 127, the counter 125 is incremented and the resultant counter value is stored in the document 127 as counter value 129. After the counter value 129 is assigned to document 127, the subcategory bitmap 120 is updated. The process of updating the subcategory bitmap 120 involves setting the bit whose bit position equals the value of the counter value 129 assigned to the document 127 to a value of "1." For example, if the counter value 129 of the document 127 is assigned a value of "0," and the document 127 is indexed in the subcategory 121, then bit 0 of the subcategory bitmap 120 is set to a value of "1," thus indicating that document 127 is indexed in the subcategory 121. This example also makes clear that the counter value 129 specifies the order in which the document 127 was indexed in the file index 117 relative to other documents stored in the computer system 100.

In this way, the preferred embodiment of the present invention uses the information represented by bit values of the subcategory bitmaps 119 to monitor the documents indexed in each subcategory of the file index 117.

Each of the category bitmaps 131 specifies the documents indexed in an associated category, such as category 133 or category 135 of the file index 117. Each category is the union of its subcategories. As will be described in more detail below, when the computer system 100 needs a category bitmap 131, the category bitmap is computed from the subcategory bitmaps 119 stored in the file index 117 for its subcategories. The preferred process of computing the category bitmaps 131 is discussed in detail below in relation to FIG. 5.

Figure 3:
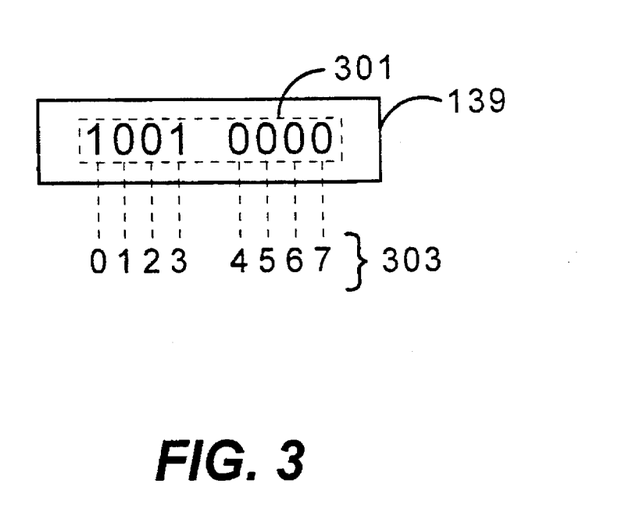
FIG. 3 illustrates a user bitmap generated in accordance with the preferred embodiment of the present invention.

In order to determine which documents in a selected category have been read by the user, the computer system 100 monitors the documents that users have read by maintaining the user bitmaps 137. FIG. 3 illustrates a preferred data structure for a user bitmap 139 stored in the computer memory 111 and associated with a particular user of the computer system 100. While user bitmaps will be discussed by way of example to user bitmap 139, it should be understood that the discussion applies to all user bitmaps 137. The data structure preferably used to represent the user bitmap 139 is identical to the data structure used to represent the category bitmaps 131. The user bitmap 139 comprises a group of bits 301. Each bit in the group 301 has a bit position 303. By convention, bits in the user bitmap 139 are referenced by their bit position.

As with the category bitmaps 131, each bit in the user bitmap 139 can be assigned a value of "0" or "1." However, when one of the bits in the user bitmap 139 is assigned a value "1," the user has read the document associated with the bit position. Whenever the user reads a document stored in the file index 117, the user bitmap 139 is updated. The process of updating the user bitmap 139 involves setting the bit in the user bitmap 139 whose bit position equals the counter value of the document to a value of "1." For example, for a document assigned a counter value of "1," bit 1 of the user bitmap 139 is set to a value of "1." Likewise, for a document assigned a counter value of "4," bit 4 of the user bitmap 139 is set to a value of "1." Thus, the preferred embodiment of the present invention uses the information presented by the bit values of the user bitmaps 137 to monitor which documents the user has read. In the preferred embodiment the present invention invokes a compressor 140 to compress the category bitmaps 131 and the user bitmaps 137 using run length encoding into a compressed format which requires less space in the computer memory 111 than a corresponding initial structure. The compressed category bitmap 131 and user bitmaps 137 can be saved to the permanent storage device 107.

Now that some of the primary data structures used by the present invention have been described, an operation of the preferred embodiment is perhaps best explained by way of example. The preferred method and system for determining which documents in a group of documents have been read or remain unread by a user is typically user-initiated. Suppose that the user, using the input device 105, enters a request to determine the documents in the category 135 which the user has read. The central processing unit 109 receives the request via the interface 113 and forwards the request to the operating system 115.

In response to the request, the operating system 115, while executing on the CPU 109, invokes code 141 to perform the read/unread request. The code 141 to perform a read/unread request will be described in relation to the flow diagram of FIG. 4. In step 401, the code 141 receives the read/unread request entered by the user. In step 403, the code 141 obtains from the request the category upon which to perform the read/unread processing. For purposes of this example, the user requests information regarding which documents in the category 135 of the file index 117 have been read by the current user. In step 405, the code 141 to perform a read/unread request invokes the code 143 to compute a category bitmap.

Figure 4:
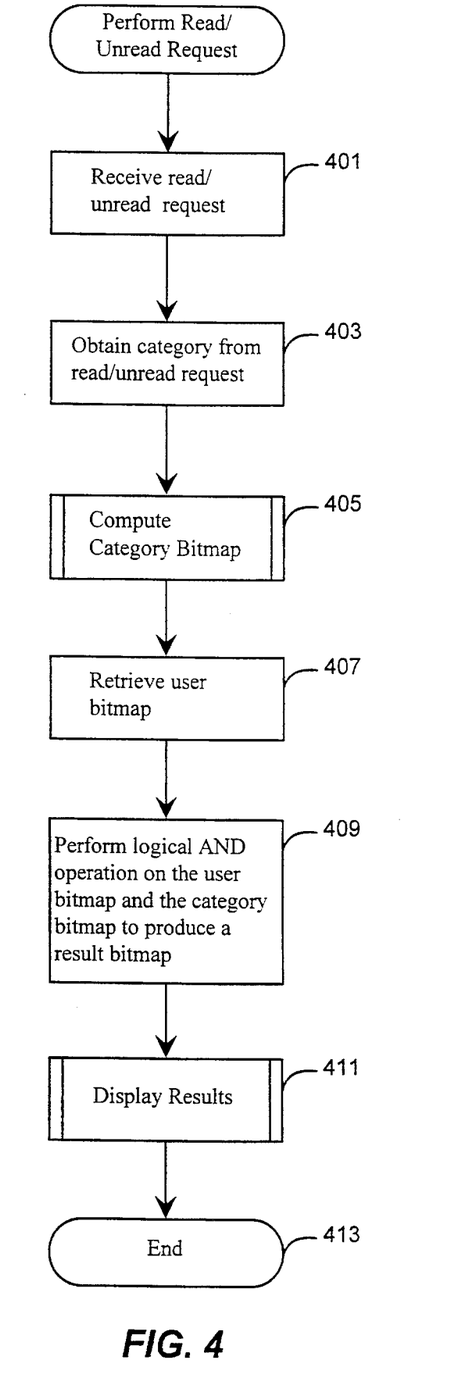
FIG. 4 is a flow diagram of code that performs a read/unread request for the system of FIG. 1.
Figure 5:
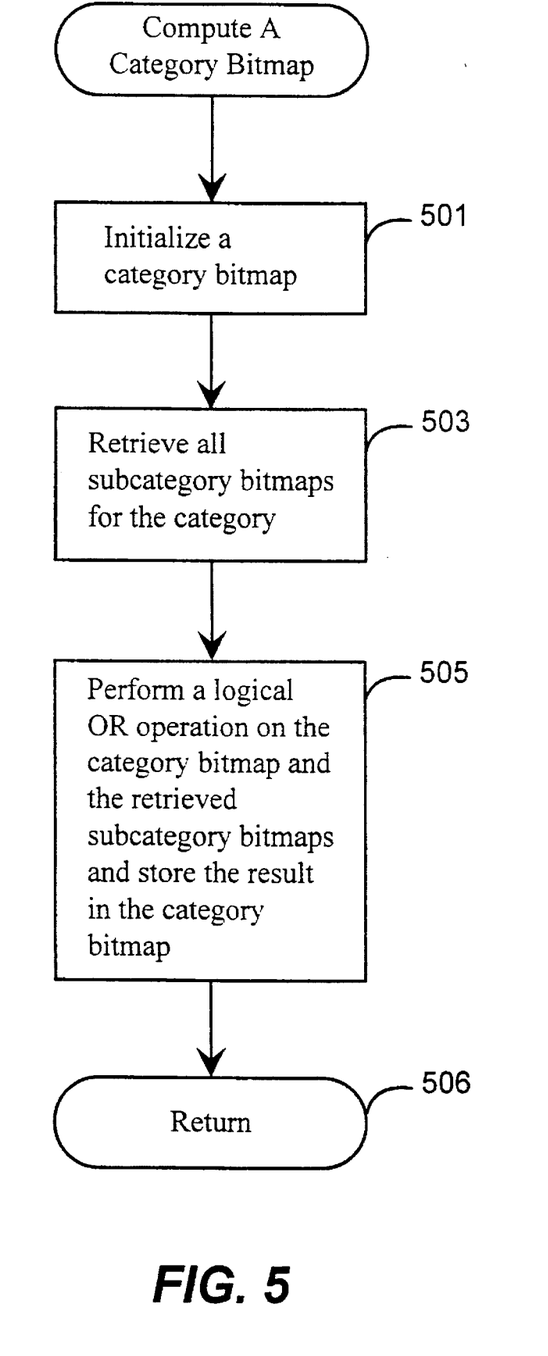
FIG. 5 is a flow diagram of code to compute a category bitmap for the system of FIG. 1.
Figure 6A:
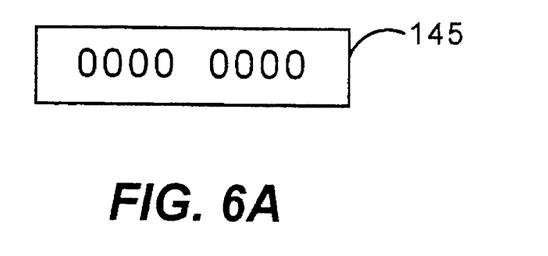
FIGS. 6A, 6B, and 6C illustrate a state of a category bitmap during various stages of computing the category bitmap.
Figure 6B:
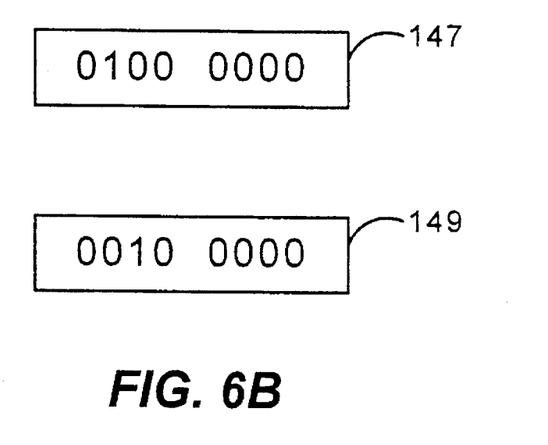
Figure 6C:
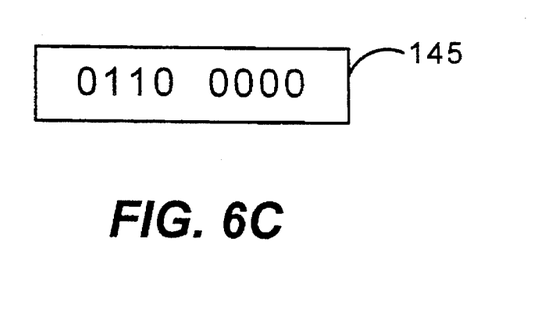

FIG. 5 is a flow diagram of the code 143 to compute a category bitmap for the system of FIG. 1 (i.e., step 405 in FIG. 4). The code 143 will be described in conjunction with the block diagrams of FIGS. 6A, 6B, and 6C which illustrate a current state of a category bitmap during processing of the code 143 to compute a category bitmap. In step 501, the code 143 initializes a category bitmap. FIG. 6A illustrates an initialized state (i.e., all bits have a value of "0" indicating that no documents are as yet in the category) of a category bitmap 145 which is associated with the category 135 of the file index 117. In step 503, the code 143 retrieves all the subcategory bitmaps for the category 135. FIG. 6B illustrates retrieved subcategory bitmap 147 and retrieved subcategory bitmap 149. In step 505, the code 143 performs a logical OR operation on the initialized category bitmap 145 and the retrieved subcategory bitmaps 147 and 149. FIG. 6C illustrates a state of the category bitmap 145 after the code 143 performs the logical OR operation. In step 506, the code 143 to compute a category bitmap returns processing control to the code 141 to perform a read/unread request.

Figure 7A:
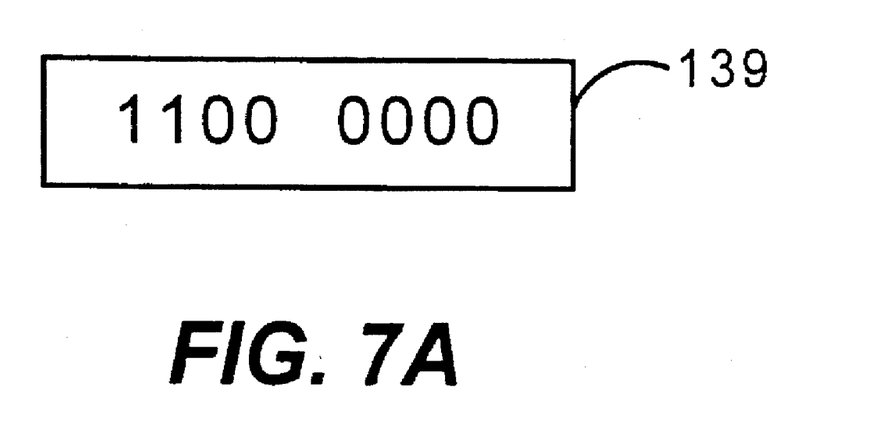
FIGS. 7A and 7B depict a current state of the user bitmap during various stages of computing a result bitmap.
Figure 7B:
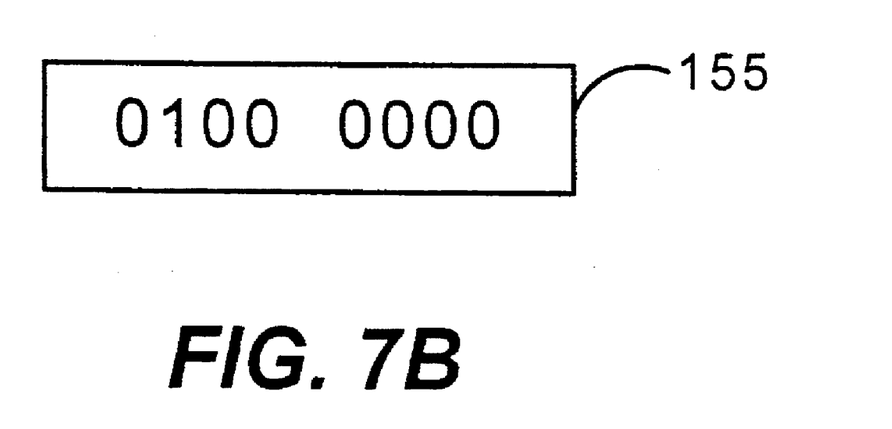

After the category bitmap has been computed (step 405 in FIG. 4), the code 141 retrieves the user bitmap associated with the user that entered the read/unread request (step 407). For purposes of this example, the user bitmap associated with the current user of the computer system 100 is the user bitmap 139. FIG. 7A depicts a current state of the user bitmap 139. Assuming that document 127 stored in the permanent storage device 107 has a counter value 129 of "0", and document 151 has a counter value 153 of "1," the user bitmap 139 appears as shown in FIG. 7A. Bitmap 139 indicates that the current user has read documents 127 and 151. In step 409 (FIG. 4), code 141 performs a logical AND operation on the user bitmap 139 (FIG. 7A) and the category bitmap 145 (FIG. 6C) to produce a result bitmap 155 (FIG. 7B) that is stored in computer memory 111. The value of the bits in the result bitmap 155 indicate which documents in the category 135 the current user has read. As FIG. 7B illustrates, the current user of the computer system 100 has read document 151 from the category 135. In step 411 (FIG. 4), code 141 to perform a read/unread request invokes code 157 to display results. The code 157 displays the results of the read/unread request, as indicated by the result bitmap 155, on the video display device 103.

Figure 8:
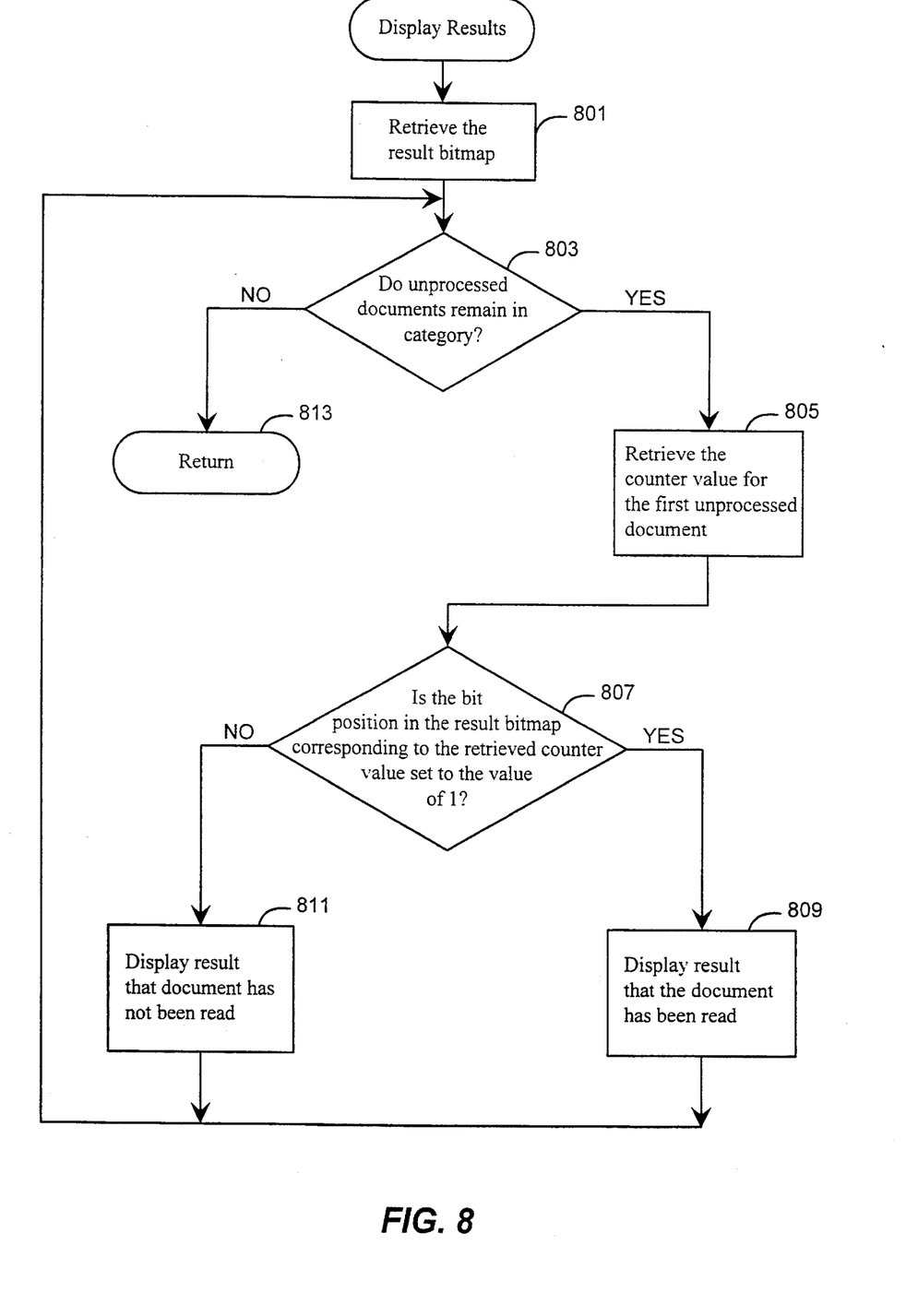
FIG. 8 is a flow diagram of code for displaying results in the system of FIG. 1.

FIG. 8 is a flow diagram of the code 157 to display results that is called in step 411 (FIG. 4). In step 801, code 157 retrieves the result bitmap 155 (FIG. 7B). In step 803, code 157 determines if unprocessed documents remain in the category 135 that have not been processed by the code 157. In step 805, the code 157 retrieves the counter value for the first unprocessed document. For example, the code 157 retrieves counter value 153 for document 151. In step 807, code 157 determines if the bit position in the result bitmap 155 corresponding to the value of the counter value 153 from document 151 has a value of "1." For example, if the counter value 153 is set to a value of "1," code 157 determines if bit 1 of the result bitmap 155 is set to a value of "1." If the bit position in the result bitmap 155 corresponding to the retrieved counter value is set to a value of "1," then, in step 809, code 157 displays on the video display device 103 that the document has been read by the current user.

Upon completion of step 809, processing continues with step 803. However, if in step 807, the bit position in the result bitmap 155 corresponding to the retrieved counter value is set to a value of "0," then in step 811 code 157 displays on the video display device 103 an indication that the document has not been read by the current user. Upon completion of step 811, processing continues with step 803. If all documents in the category have been processed, then in step 813, code 157 to display results returns processing control to code 141.

The example discussed above in connection with code 141 to perform the read/unread request, shows an operation of the preferred embodiment of the present invention after the category bitmaps 131 and the subcategory bitmaps 119 of the file index 117 have been updated with values that represent a current state of the computer system 100. FIGS. 9 through 12 illustrate a preferred process of the present invention for updating the user bitmaps 137 and the subcategory bitmaps 119 in response to an occurrence of specific events (discussed below) in the computer system 100. In this way, code 141 displays the most up-to-date results to the user in response to a read/unread request.

Figure 9:
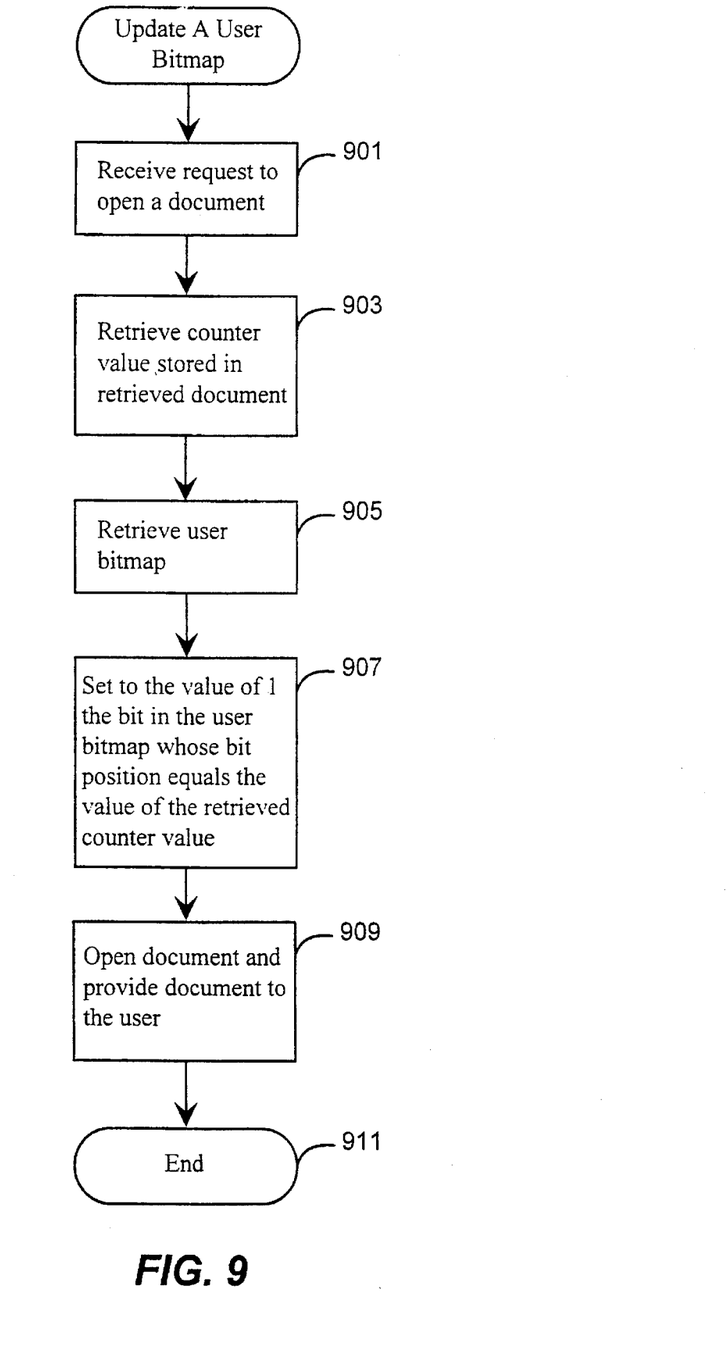
FIG. 9 is a flow diagram of the steps performed to update a user bitmap in the system of FIG. 1.
Figure 10A:
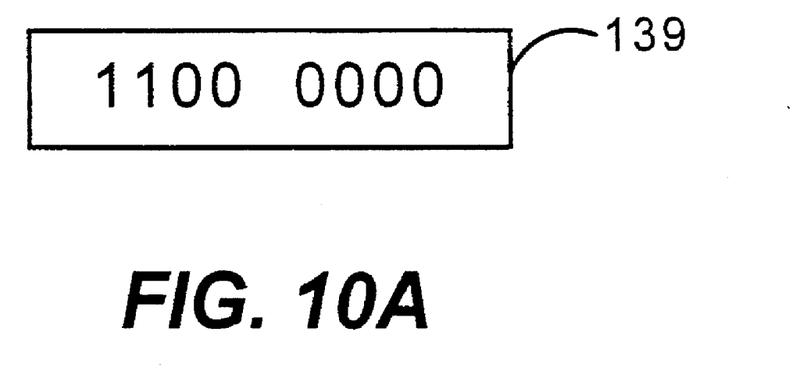
FIGS. 10A and 10B are block diagrams illustrating states of the user bitmap during various points in the user bitmap update process.
Figure 10B:
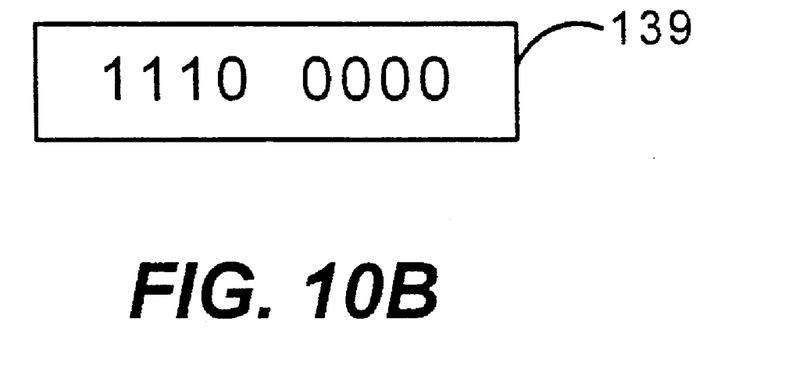

FIG. 9 is a flow diagram of code 159 for updating a user bitmap for the system of FIG. 1. Code 159 identifies the documents stored in the permanent storage device 107 that the user has just opened, and sets a bit in the user bitmap which identifies that the document has been opened. Code 159 will be described in conjunction with the block diagrams of FIGS. 10A and 10B, which illustrate a current state of a user bitmap during processing of code 159 for updating a user bitmap. In step 901, code 159 receives a request entered by the current user to open a document 161 stored on the permanent storage device 107. In step 903, code 159 retrieves a counter value 163 stored in the document 161. For purposes of this example, the counter value 163 is set to a value of "2." In step 905, code 159 retrieves the user bitmap 139 associated with the current user of the computer system 100. FIG. 10A is a block diagram illustrating a current state of the user bitmap 139 after it has been retrieved in step 905. As FIG. 10A illustrates, bits 0 and 1 of the user bitmap 139 are set to a value of "1." In step 907, the code 159 sets to the value of "1" the bit in the retrieved user bitmap that corresponds to the retrieved counter value from the document. Because the counter value 163 has a value of 2, code 159 sets bit 2 in the user bitmap 139 to a value of "1." FIG. 10B illustrates the state of the user bitmap 139 upon completion of step 907. In step 909, code 159 opens the retrieved document and provides the document to the user. In step 911, code 159 completes processing.

Figure 11:
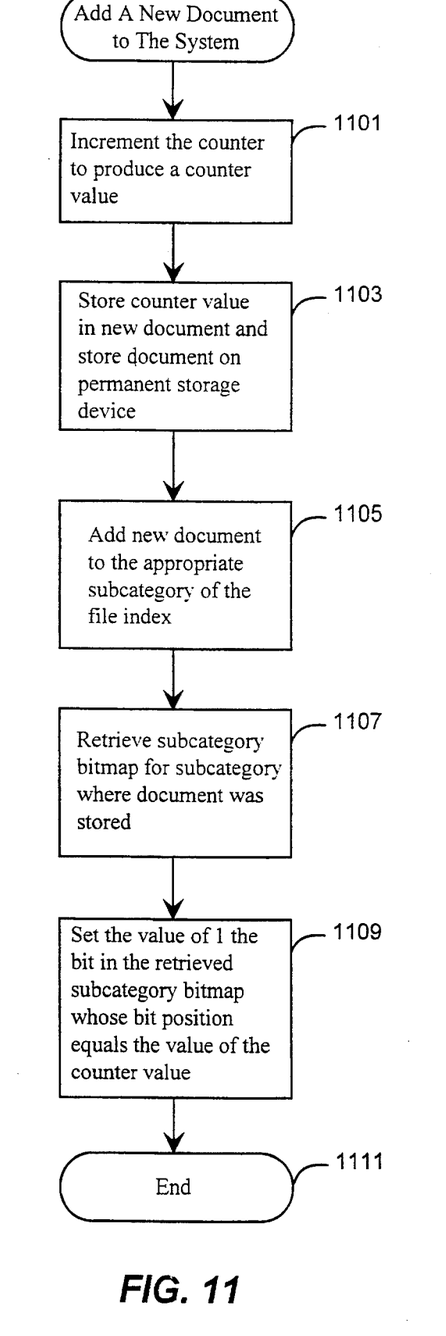
FIG. 11 illustrates a flow diagram of code to add a new document to the system.

FIG. 11 illustrates a flow diagram of code 165 for adding a new document to the system of FIG. 1. Code 165 for adding a new document to the system indexes a document in a subcategory of the file index 117 and updates the subcategory bitmap 119 associated with the subcategory by setting a bit in the subcategory bitmap 119 which identifies the document to a value of "1." In this way, the subcategory bitmap 119 indicates that the subcategory stores the document.

In step 1101, code 165 increments the counter 125 to produce a counter value. In step 1103, code 165 stores the counter value in the new document, and stores the new document on the permanent storage device 107. In step 1105, code 165 adds the new document to the appropriate subcategory of the file index 117. In step 1107, code 165 retrieves the subcategory bitmap for the subcategory where the document was added. In step 1109, code 165 sets to the value 1 the bit in the retrieved subcategory bitmap whose bit position equals the value of the counter value. For example, if the counter value has a value of 5, then bit 5 in the retrieved subcategory bitmap will be set to the value of 1. In step 1111, code 165 to add a new document to the system ends processing.

Figure 12:
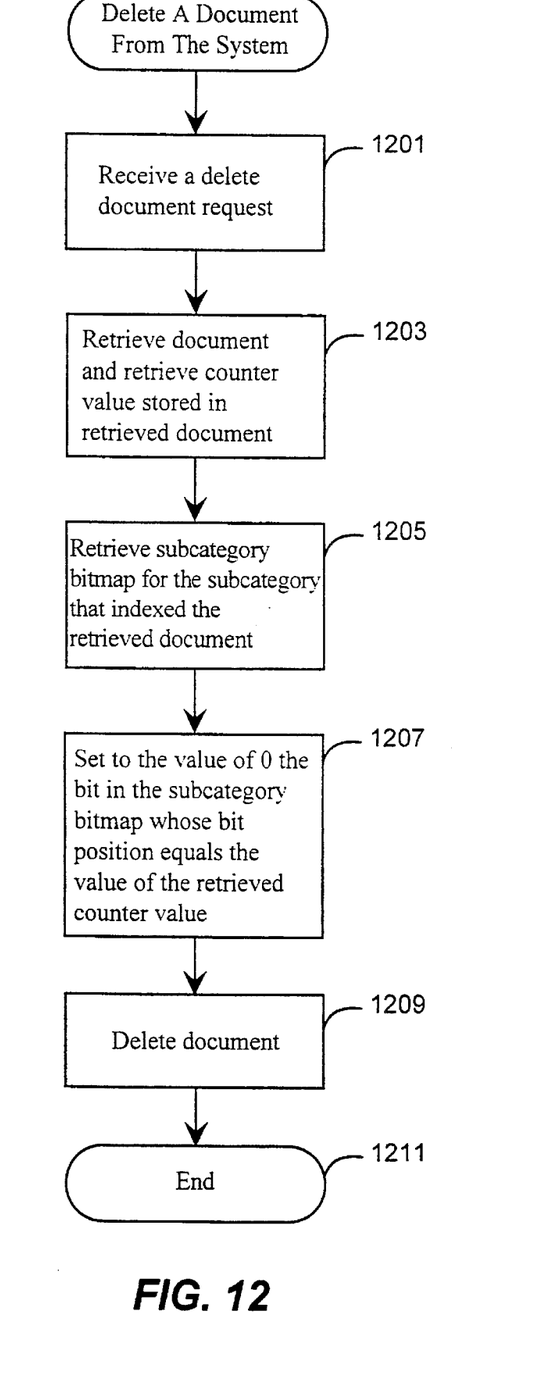
FIG. 12 illustrates a flow diagram of code to delete a document from the system.

FIG. 12 illustrates a flow diagram of code 167 for deleting a document from the system. Code 167 deletes the document from the permanent storage device 107, and updates the subcategory bitmap associated with the subcategory which includes the document. In this way, subcategory bitmap indicates that the subcategory no longer indexes the document. In step 1201, code 167 receives a delete document request. In step 1203, the code 167 retrieves the counter value stored in the retrieved document. In step 1205, the code 167 retrieves the subcategory bitmap for the subcategory in which the document was indexed. In step 1207, the code 167 sets the bit in the subcategory bitmap whose bit position corresponds to the counter value of the retrieved document to a value of "0." In step 1209, the code 167 deletes the retrieved document from the permanent storage device. In step 1211, the code 167 to delete a document from the system ends processing.

Those of ordinary skill in the art will understand that while the code of the present invention has been described in connection with a read/unread request of documents, the code of the present invention can be used to monitor any attribute of a file. While the preferred embodiment of the present invention updates the current user's user bitmap upon an opening of a document, those of ordinary skill in the art will understand that the user bitmap could be updated in response to other system events which indicate that the user has read the document. While the preferred embodiment has been described with reference to folders and directories, those of ordinary skill in the art will understand that the concepts discussed herein can be applied to any groups of files. Thus, it will be appreciated that, although a specific embodiment of the invention has been described herein for purposes of illustration, various modifications may be made without departing from the spirit and scope of the invention.

I claim:

1. A method executed in a computer system for monitoring attributes of files, the computer including a processor for performing processing on the files, comprising the steps of:

providing a file index organized into groups with at least one group including one or more files;

providing a group bitmap for at least one group, the group bitmap specifying the files included within the group;

providing an attribute bitmap specifying the files in the file index that have the been processed by the processor; and examining the group bitmap and the attribute bitmap to determine which files are in the group and which files have been processed.

2. The method of claim 1 wherein the step of examining includes step of:

performing a logical AND operation on the attribute bitmap and the group bitmap to produce a result bitmap which has bit values specifying which files in the group have been processed.

3. The method of claim 1 wherein at least one group is organized into one or more subgroups, and wherein the step of providing the group bitmap includes the steps of:

providing one or more subgroup bitmaps, each subgroup bitmap having bits associated with the files stored in a corresponding one of the subgroups of the group; and performing a logical OR operation on the subgroup bitmaps included within the group to create the group bitmap.

4. The method of claim 3 wherein the step of providing one or more subgroup bitmaps includes the steps of:

associating a current value of a counter with each file stored in the subgroup; and setting bits in the subgroup bitmap at bit positions specified by the counter value for each file stored in the subgroup.

5. The method of claim 4 wherein the counter has a monotonically increasing value.

6. The method of claim 4 wherein the counter has a monotonically decreasing value.

7. The method of claim 4 wherein the step of associating the current value of the counter with each file includes the step of incrementing the counter each time a file is added to the file index to create the current value of the counter.

8. The method of claim 1 wherein the step of providing an attribute bitmap includes the steps of:

receiving a request to perform processing on a selected one of the files;

retrieving, in response to receiving the request, a counter value associated with the selected file; and setting to a value of 1 the bit in the attribute bitmap at a bit position corresponding to the counter value associated with the selected file.

9. The method of claim 7 wherein the counter has a monotonically increasing value.

10. The method of claim 7 wherein the counter has a monotonically decreasing number.

11. The method of claim 1 wherein the step of providing the group bitmap for at least one group includes the step of compressing the group bitmaps to produce compressed group bitmaps.

12. The method of claim 1 wherein the processing is opening of the files.

13. A method executed in a computer system for determining which files are contained within each of the plurality of subcategories, which together comprise a logical organization of the files, the method comprising the steps of:

for each subcategory, providing a subcategory bitmap holding bits that specify which files are contained within the subcategory, each file having a corresponding bit at a bit position;

assigning a counter value of a counter to each file in the subcategory; and setting the corresponding bit in the subcategory bitmap at the bit position specified by the counter value to indicate that the file is contained within the subcategory.

14. A method executed in a computer system for determining which files are contained within at least one of a plurality of categories, at least one of the categories being organized into one or more subcategories, the categories and subcategories together comprising a logical organization of the files, the method comprising the steps of:

for each category, providing a subcategory bitmap holding bits that specify which files contained within the subcategory; and for each category which includes one or more subcategories, performing a logical OR operation on all the subcategory bitmaps included within the category so as to create a category bitmap which specifies the files contained within the category.

15. A method executed in a computer system for monitoring attributes of files, the computer including a processor for performing processing on the files, comprising the steps of:

providing a file index organized into groups, with at least one group including one or more files;

providing a group bitmap for at least one of the groups, the group bitmap specifying the files that are included within the group;

providing an attribute bitmap specifying which files in the file index have been processed;

receiving a query which requests information regarding which files in the group for which a group bitmap is provided have been processed; and in response to receiving the query, examining the group bitmap and the attribute bitmap to determine which files are in the group and have had the processing performed on them.

16. A method executed in a computer system for monitoring attributes of files, the computer including a processor for processing the files, and a memory, comprising the steps of:

providing a file index organized into groups, with at least one group including one or more files;

providing a group bitmap for at least one group, the group bitmap specifies which of the files are included within the group, each group bitmap having an initial format which defines an initial structure of the group bitmap as it is stored in the memory;

compressing at least one of the group bitmaps into a compressed format which requires less storage space in the memory than the corresponding initial structure;

providing an attribute bitmap that specifies which of the files in the file index have been processed; and examining the group bitmap and the attribute bitmap to determine which files are in the group and which files have been processed.

17. A computer system for monitoring attributes of files, the computer system including a processor for processing the files, comprising:

a file index organized into groups with at least one group including one or more files;

a group bitmap for at least one group, the group bitmap specifying the files included within the group;

an attribute bitmap specifying the files in the file index that have been processed by the processor; and an examiner for examining the group bitmap and the attribute bitmap to determine which files are in the group and have been processed.

18. The system of claim 17, further comprising means for performing a logical AND operation on the attribute bitmap and the group bitmap to produce a result bitmap which has bit values specifying which files in the group have been processed.

19. The system of claim 17 wherein at least one group is organized into one or more subgroups, and wherein the group bitmap includes one or more subgroup bitmaps, each subgroup bitmap having bits associated with the files stored in a corresponding one of the subgroups of the group; and wherein the processor further includes means for performing a logical OR operation on all the subgroup bitmaps included within the group to create the group bitmap.

20. The system of claim 19 wherein the processor associates a current value of a counter with each file stored in the subgroup and sets the bits in the subgroup bitmap corresponding to each counter value associated with each file stored in the subgroup.

21. The system of claim 20 wherein the counter has a monotonically increasing value.

22. The method of claim 20 wherein the counter has a monotonically decreasing value.

23. The method of claim 20 wherein the processor associates the counter value with each file by incrementing the counter each time a file is added to the folder index to create the current value of the counter.

24. The system of claim 17 further comprising:

a receiver for receiving a request to perform the preselected type of processing on a selected one of the files;

a retriever for retrieving, in response to receiving the request, the counter value associated with the selected file; and a setter for setting the bit in the attribute bitmap corresponding to the counter value associated with the selected file.

25. The system of claim 23 wherein the counter has a monotonically increasing number.

26. The system of claim 23 wherein the counter has a monotonically decreasing number.

27. The system of claim 17 including a compressor for compressing the group bitmaps.

28. The system of claim 17 wherein the processing is opening of the files.

29. A computer system for determining which files are contained within each of the plurality of subgroups which together comprise a logical organization of the files, the system comprising:

for each subgroup, a subgroup bitmap holding bits that specify which files are contained within the subgroup; and an assignor for assigning a counter value of a counter to each file in the subgroup; and a setter for setting the corresponding bit in the subgroup bitmap at the bit position specified by the counter value so as to indicate that the file is contained within the subgroup.

30. A computer system for determining which files are contained within at least one of a plurality of groups, at least one of the groups being organized into one or more subgroups, the groups and subgroups together comprising a logical organization of the files, the system comprising:

for each group, a subgroup bitmap holding bits that specify the files contained within the subgroup; and for each group which includes one or more subgroups, a processor for performing a logical OR operation on all the subgroup bitmaps included within the group so as to create a group bitmap which specifies the files contained within the group.

31. A computer system for monitoring attributes of files, the system comprising:

a storer for storing data;

a processor for processing data;

a file index organized into groups, with at least one group including one or more files, the file index residing in the storer;

a group bitmap for at least one of the groups, the group bitmap specifying the files that are included within the group, the group bitmaps residing in the storer;

an attribute bitmap specifying which files in the file index have been processed, the attribute bitmaps residing in the storer;

a query receiver for receiving a query which requests information regarding which files in the group for which a group bitmap is provided have been processed; and a bitmap examiner for examining the group bitmap and the attribute bitmap to determine which files are in the group and have had the preselected type of processing performed on them.

32. A computer system for monitoring attributes of files, comprising:

a storer for storing data;

a processor for processing data;

a file index organized into groups with at least one group including one or more files, the file index residing in the storer;

a group bitmap for at least one group, the group bitmap specifying which of the files are included within the group, each group bitmap having an initial format which defines an initial structure of the group bitmap as it is stored in the memory, the group bitmaps residing in the storer;

a compressor for compressing at least one of the group bitmaps into a compressed format which requires less storage space in the storer than the corresponding initial structure;

an attribute bitmap specifying which of the files in the file index have been processed, the attribute bitmap residing in the storer; and a bitmap examiner for examining the group bitmap and the attribute bitmap to determine which files are in the group and which files have been processed.

33. A computer system for monitoring attributes of files, comprising:

a storer for storing files;

a processor for processing files;

an attribute bitmap stored in the storer for specifying which files have been processed; and an indicator for examining the attribute bitmap and indicating which files have been processed.

* * * * *

UNITED STATES PATENT AND TRADEMARK OFFICE
CERTIFICATE OF CORRECTION

PATENT NO. : 5,504,889
DATED : April 2, 1996
INVENTOR(S) : Henry W. Burgess

It is certified that error appears in the above-indentified patent and that said Letters Patent is hereby corrected as shown below:

In column 7, claim 1, line 42, following "have", please delete "the".

Signed and Sealed this

Ninth Day of July, 1996

Attest:

BRUCE LEHMAN

Attesting Officer     Commissioner of Patents and Trademarks